United States Patent [19]

Jung et al.

[11] Patent Number: 5,026,831
[45] Date of Patent: Jun. 25, 1991

[54] WATER-INSOLUBLE DISAZO COLORANTS HAVING HETERO-BICYCLIC METHYLENE-ACTIVE COMPOUNDS AS COUPLING COMPONENT

[75] Inventors: Rüdiger Jung, Kelkheim; Reinhold Deubel, Bad Soden am Taunus, both of Fed. Rep. of Germany

[73] Assignee: Hoechst Aktiengesellschaft, Frankfurt am Main, Fed. Rep. of Germany

[21] Appl. No.: 269,565

[22] Filed: Nov. 10, 1988

[30] Foreign Application Priority Data

Nov. 13, 1987 [DE] Fed. Rep. of Germany ....... 3738542

[51] Int. Cl.$^5$ .................. C09B 33/12; D06P 1/04; D06P 3/24; D06P 3/52; D06P 3/79
[52] U.S. Cl. .................. 534/752; 534/573; 534/581; 534/761; 534/887; 548/359
[58] Field of Search ................ 534/761, 752

[56] References Cited

U.S. PATENT DOCUMENTS

| | | | |
|---|---|---|---|
| 2,115,030 | 4/1938 | McNally et al. | 534/761 X |
| 2,822,247 | 7/1974 | Ozutsumi et al. | 534/761 X |
| 3,600,375 | 8/1971 | Wang et al. | 534/752 |
| 3,694,216 | 9/1972 | Jenkins | 96/128 |
| 3,706,725 | 12/1972 | Ozutsumi et al. | 534/761 X |
| 3,882,099 | 5/1975 | L'Eplattenier et al. | 534/761 X |

FOREIGN PATENT DOCUMENTS 1224183  6/1960  France .................. 534/761
900764  6/1962  United Kingdom ........ 534/752

OTHER PUBLICATIONS

G. Fritsch et al., Arch. Pharm. (Weinheim), 319, 646-654 (1986).

*Primary Examiner*—Mary C. Lee
*Assistant Examiner*—Fiona T. Powers

[57] ABSTRACT

The invention relates to compounds of the formula (I)

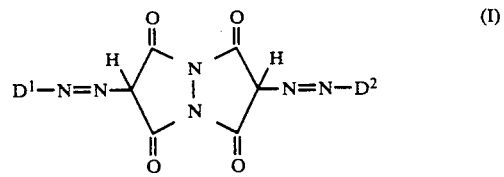

where $D^1$ and $D^2$ are each independently of each other unsubstituted or substituted aryl or hetaryl. The compounds are obtained by diazotizing one or more amines of the formula D-NH$_2$ where D has the meaning $D^1$ or $D^2$ as per the formula (I) and coupling with 0.5 mole of 1,5-diazabicyclo[3.3.0]octane-2,4,6,8-tetrone per mole of total reacting diazonium salts. Depending on the presence and length of alkyl chains the compounds are suitable for use as pigments, disperse dyes or even fat dyes.

3 Claims, No Drawings

WATER-INSOLUBLE DISAZO COLORANTS HAVING HETERO-BICYCLIC METHYLENE-ACTIVE COMPOUNDS AS COUPLING COMPONENT

Description

The present invention relates to azo colorants having at least two azo groups.

The present invention provides compounds of the idealized general formula (I)

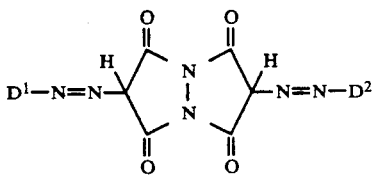

where $D^1$ and $D^2$ are each independently of the other unsubstituted or substituted aryl or heteroaryl, preferably a radical of an aromatic compound from the benzene, naphthalene, fluorene or anthraquinone series or from the heterocyclic series.

Of particular interest are compounds of the general formula (I) where $D^1$ and $D^2$ are each independently of the other unsubstituted or substituted aryl or heteroaryl from the following group: phenyl, phenyl having 1-3 substituents, naphthyl, naphthyl having 1-4 substituents, a radical of an anthraquinone or fluorene with up to 4 substituents, a radical of a heterocyclic system comprising 1 to 5 five- or six-membered rings with up to 4 substituents, each having the meaning $A^1$ or $A^2$ where $A^1$ stands for a radical from the group consisting of saturated or unsaturated straight-chain or branched $C_1-C_{24}$-alkyl, $C_1-C_{24}$-alkoxy, $C_1-C_{24}$-hydroxyalkyl, $C_5-C_{10}$-cyclo-alkyl, $C_1-C_{24}$-alkoxycarbonyl, $C_2-C_{25}$-alkanoyloxy, $C_2-C_{25}$-alkanoylamino, $C_1-C_{24}$-alkylsulfonyl, carbamoyl, N-($C_1-C_{12}$-alkyl) aminocarbonyl, N,N-di-($C_1-C_{12}$-alkyl)aminocarbonyl, $C_1-C_{12}$-alkylamino, N,N-di-($C_1-C_{12}$-alkyl)amino, sulfamoyl, N-($C_1-C_{12}$-alkyl)aminosulfonyl, N,N-di-($C_1-C_{12}$-alkyl)aminosulfonyl, halogen, such as fluorene, chlorine and bromine, nitro, cyano, trifluoromethyl, carboxyl, sulfo, $C_1-C_{12}$-alkylthio, $C_2-C_{25}$-alkanoyl and hydroxyl and $A^2$ stands for a radical of the formula Ar—W— where W is a direct bond or a divalent group of the formula — S—, —O—, —CO—, —CO—O—, —O—CO—, —CO—NH—, —NH—CO—, —SO—, —SO$_2$—, —SO$_2$NH—, —NHSO$_2$—, —CH$_2$—, —CH(CH$_3$)—, —C(CH$_3$)$_2$—, —NR'—where R' denotes hydrogen or $C_1-C_6$-alkyl, or is —N=N— or a combination of at least two of the foregoing divalent groups and Ar denotes the radical of a carbocyclic or heterocyclic aromatic system comprising one or two rings, in particular phenyl, naphthyl or phenyl onto which a heterocyclic 5- or 6-membered ring incorporating 1-3 heteroatoms, in particular nitrogen, sulfur or oxygen as the heteroatom, is fused, or denotes one of the foregoing radicals Ar which additionally has 1-3 of the above-defined substituents $A^1$.

Preference is given to compounds of the formula (I) where $D^1$ and $D^2$ are each independently of the other aryl or heteroaryl from the following group: phenyl, phenyl having 1-3 substituents, naphthyl, naphthyl having 1-3 substituents, a radical of an anthraquinone or fluorene with 1-3 substituents and a radical of a heterocyclic system with 1 to 5, in particular 2, five- or six-membered rings, such as benzimidazole, benzimidazol-2-one, phthalimide, quinazoline, carbazole, benzothiazole, quinazolin-4-one, quinazoline-2,4-dione, indole, isoindole, quinoline, isoquinoline, quinoxazline, quinoxaline-2.3-dione, indazole, quinolin-2-one, benzimidazo[1,2-a]pyrimid-2one, benzothiazol-2-one, benzo[e][1,3]oxazine-2,4-dione, benzo[e][1,4]oxazin-3-one, benzotriazole, benzoxazol-2one, benzimidazole-2-thione, benzo[cd]indol-2-one, benzo[de]isoquinoline-1,3-dione (naphthalimide), 1,2,4-thiazdiazole, 1,3,4-thiadiazole, thiazole, isothiazole, thiophene, dibenzo[a,c]-phenazine, cinnoline and phthalazine, which each may have 1-3 substituents, the substituents on substituted aryl and heteroaryl each having the meaning $A^1$ or $A^2$.

Of the heterocyclic systems mentioned as possibilities for $D^1$ or $D^2$, the following are particularly suitable: benzothiazole, benzimidazole, benzimidazol-2-one, quinolin-2-one, quinazoline-2,4-dione, carbazole, benzoxazol2-one, phthalimide, quinoxaline-2,3-dione, phthalazine1,4-dione.

$A^1$ preferably stands for a radical group consisting of $C_1-C_4$-alkyl, such as methyl, ethyl, propyl, isopropyl, butyl, isobutyl, 2-butyl and 2-methylprop-2-yl, in particular methyl and ethyl, C -C.-alkoxy, such as methoxy, ethoxy, propoxy, isopropoxy, butoxy, isobutoxy, 2butoxy and tert-butoxy, in particular methoxy and ethoxy, $C_1-C_4$-alkoxycarbonyl, $C_2-C_5$-alkanoyloxy, $C_2-C_5$-alkanoylamino, carbamoyl, N-($C_1-C_4$-alkyl)aminocarbonyl, N,N-di-($C_1-C_4$-alkyl) aminocarbonyl, sulfamoyl, N-($C_1-C_4$-alkyl)- and N,N-di-($C_1-C_4$-alkyl)-aminosulfonyl, chlorine, bromine, nitro, trifluoromethyl, ethylsulfonyl, carboxyl, sulfo cyano.

$A^2$ preferably stands for a radical of the formula Ar—W— where W is a divalent group of the formula —O—, —CO—O—, —O—CO—, —CO—NH—, —NH—CO—, —SO$_2$—, —SO$_2$NH—, —NHSO$_2$—, —CH$_2$—, —NH— or —N=N— or a combination of two of the divalent groups mentioned and Ar denotes phenyl, naphthyl or phenyl together with a fused-on five- or six-membered heterocyclic ring containing one or two heteroatoms, in particular nitrogen atoms or nitrogen or sulfur atoms, or one of the foregoing radicals Ar which additionally has 1 to 3 substituents $A^1$ of the above-defined meaning.

Preference is given to compounds of the formula (I) according to the invention where $D^1$ and $D^2$ have the same meaning.

The general formula (I) is to understood as an idealized formula and also encompasses the corresponding tautomeric compounds and also the possible configuration isomers of every tautomeric form. In this connection it may be remarked that compounds having carbonyl groups in the α-position relative to the arylazo-substituted carbon atom are normally present in the hydrazo form. The idealized formula (I) therefore also encompasses in particular the bishydrazone form.

The present invention also provides a process for preparing the compounds of the idealized general formula (I) according to the invention by diazotizing one or more amines of the formula D—NH$_2$, where D has the meaning $D^1$ or $D^2$ as per the formula (I) and coupling with 0.5 mole of 1,5-diazabicyclo[3.3.0]octane- 2,4,6,8-tetrone per mole of total reacting diazonium salts.

Suitable diazo components D—NH$_2$ are diazotizable aromatic amines, in particular anilines, naphthylamine, aminofluorenes, aminoanthraquinones and heterocyclic aromatic amines, and the diazotizable amines may each be monosubstituted or polysubstituted. Of particular suitability are aromatic amines D—NH$_2$ where D denotes the aryl radicals mentioned as preferred for D$^1$ and D$^2$.

Suitable aromatic amines D-NH: are for example aniline and substituted anilines, preferably aniline having 1-3 substituents from the group consisting of methyl, ethyl, methoxy, ethoxy, carboxyl, carbomethoxy, carboethoxy, carbopropoxy, carboisopropoxy, carbobutoxy, acetoxy, carbamoyl, acetamido, N-methylaminocarbonyl, N-ethylaminocarbonyl, sulfo, phenylaminocarbonyl, mono- and dichlorophenylaminocarbonyl, in particular 2,5-dichlorophenylaminocarbonyl, 2-, 3- and 4-carbamoyl-phenylaminocarbonyl, sulfamoyl, N-methylaminosulfonyl, N-methylaminosulfonyl, N,N-dimethylaminosulfonyl, N,N-diethylaminosulfonyl, N-phenylsulfonyl, phenylazo, 2-, 3- and 4-methylphenylazo, dimethylphenylazo, phenoxy, 2-chlorophenoxyethylsulfonyl, benzoylamino, N-methylsulfonylamino, N,N-dimethylsulfonylamino, N,N-diethylsulfonylamino, 2-, 3- and 4-nitrophenylazo, 2,6-dichloro-4nitrophenylazo, 2-chloro-4-nitrophenylazo, 3-methylphenylazo, benzylsulfonyl, cyano, chloro, nitro and trifluoromethyl.

Suitable substituted anilines are for example 2-, 3- and 4-nitroaniline, -chloroaniline, -methylaniline, -trifluoromethylaniline or -methoxyaniline, 2,3-, 2,4-, 2,5-, 2,6-, 3,4- and 3,5-dinitroaniline or -dichloroaniline, 4-chloro-2-nitroaniline, 4-methyl-2-nitroaniline, 4-methoxy-2-nitroaniline, 5-chloro-2-nitroaniline, 5-methyl-2-nitroaniline, 5-methoxy-2-nitroaniline, 2-chloro-4-nitroaniline, 2-methyl-4-nitroaniline, 2-methoxy-4-nitroaniline, 2-chloro-5-nitroaniline, 2-methyl-5-nitroaniline, 2-methoxy-5-nitroaniline, 2-chloro-4-methylaniline, 2-chloro-4-methoxyaniline, 2-chloro-5methylaniline, 2-chloro-5-methoxyaniline, 5-chloro-3-methoxyaniline, 5-chloro-3-methylaniline, 4-chloro-2methoxyaniline, 4-chloro-2,5-methylaniline, 2,4,5-, 2,3,4-, 2,3,5-, 2,4,6-, 2,3,6- and 3,4,5-trichloroaniline, 2-, 3- and 4-aminobenzoic acid, methyl, ethyl, propyl or butyl 2-, 3- and 4-aminobenzoate, 2-, 3- and 4aminobenzamide, 3-chloro-2-methylaniline, 3-chloro-2methoxyaniline, 5-methyl-2-methoxyaniline, 2-, 3- and 4ethylaniline, 4-chloro-2-trifluoromethylaniline, 2-chloro-5-trifluoromethylaniline, 3,5-bis(trifluoromethyl)-aniline, 5-chloro-2-phenoxyaniline, 5-chloro-2-(4-chlorophenoxy)-aniline, 2-chloro-4-cyano-5-methylaniline, 3-aminobenzamide substituted in the 4-position by chlorine, methoxy, methyl or carbomethoxy, 4-aminobenzamide substituted in the 3-position by chlorine, methoxy, methyl or carbomethoxy, and also derivatives of the foregoing benzamides which are substituted on the amide nitrogen by groups such as methyl, ethyl, phenyl, methylphenyl, dimethylphenyl, in particular 2,4-dimethylphenyl, chlorophenyl, dichlorophenyl, in particular 4-chlorophenyl, 2,5-dichlorophenyl, 2-, 3- and 4-carbamoylphenyl, methoxyphenyl, 1,3-benzothiazol-2-yl or benzimidazol-2 -on-5-yl, 3-amino-4-methyl-N-(4-sulfophenyl)benzamide, 4phenoxyaniline, 4-phenylazoaniline, 4-(2-methylphenylazo)aniline, 2-, 3- and 4-aminobenzenesulfonamide, 4-amino-3-methoxybenzenesulfonamide, 4-amino-2,5-dimethoxybenzenesulfonamide, 4-amino-2-methoxy-5-methylbenzenesulfonamide, derivatives of the foregoing benzenesulfonamides which are substituted on the amide nitrogen by groups such as methyl, ethyl, phenyl, methylphenyl, chlorophenyl, dichlorophenyl, dimethylphenyl or methoxyphenyl, dimethyl or diethyl 2-aminobenzene-1,4-dicarboxylate, dimethyl or diethyl 5-aminobenzene-1,3-dicarboxylate, 3-amino-2-methyl-N,N-dimethylbenzenesulfonamide,4-amino-2,5-dimethoxybenzenesulafnilide, 4-amino-2,5-dimethoxy N-methylbenzenesulfonamide, 4-amino-2-methoxy-5-methyl N-methylbenzenesulfonamide, 3-amino-4-methoxybenzanilide, 4-amino-2,5-dimethoxy-N-(2,4-dimethylphenyl)benzamide, 2-phenylsulfonylaniline, 2-(ethylsulfonyl)-5-trifluoromethylaniline, 5-(ethylsulfonyl)-2-methoxyaniline, 5-benzylsulfonyl-2-methoxyaniline,3-amino-4-methoxy-N,N-diethylbenzenesulfonamide, 3-amino-4-methoxy-N-butylbenzenesulfonamide, 5-amino-2-methyl-N-phenylbenzenesulfonamide, 4-benzoylamino-2,5-dimethoxyaniline, 4-benzoylamino-2-chloro-5-methoxyaniline, 4-benzoylamino-2-methoxy-5-methylaniline, 4-cyano-2,5-diemthoxyaniline, 4-benzoylamino-2,5-dimethylanilin, 5-benxoylamino-2,4-dimethylaniline, 2,5-dimethoxy-4-(4nitrophenylazo)aniline, 4-(2,6-dichloro-4-nitrophenylazo)-2,5-dimethoxyaniline, 2-(2-chloro-4-nitrophenylazo)-5-methoxy-4-methylaniline, 4-(2-methylphenylazo)-2methylaniline, 4-(3-methylphenylazo)-3-methylaniline, 4-(4-methylnitrophenylazo)-2-methoxy-5-methylaniline, 4-phenylaminoaniline, 2-methoxy-4-phenylaminoaniline,4-(4methoxyphenylamino)aniline, 4-acetylaminoaniline, 2-, 3-and 4-aminobenzenesulfonic acid, 2-amino-4-sulfobenzoic acid, 3-methyl-4-aminobenzoic acid, 2-amino-1,4-benzenedisulfonic acid,2-amino-4-chloro-5-methylbenzenesulfonic acid, 2-amino-5-chloro-4-methylbenzenesulfonic acid, 2-amino-4-methylbenzenesulfonic acid and 5-amino-2-chloro-4-sulfobenzoic acid.

Preferred substituted anilines are for example 2-nitroaniline, 2-aminobenzoic acid, 4-nitroaniline, 2,4-dinitroaniline, methyl, ethyl, propyl or butyl 2-aminobenzoate, 2,4-dichloroaniline, 2,5-dichloroaniline, 4-chloro-2-methylaniline, 4-chloro-2-nitroaniline, 4-methyl-2-nitroaniline, 4-methoxy-2-nitroaniline, 2-methoxy-4-nitroaniline, 2-trifluoromethylaniline, 2-chloro-4-trifluoromethylaniline, 4-chloro-2-trifluoromethylaniline, dimethy 2-amino-1,4-benzenedicarboxylate, 2,4,5-trichloroaniline, p-aminoazobenzene, 4-aminobenzamide, 3-amino-4-methylbenzamide, 3-amino-4-methyl-N-methylbenzamide, 3-amino-4-methoxybenzanilide, 3-amino-4-methoxycarbonyl-N-(2,5-dichlorophenyl)benzamide, 3-amino-4-methox-N-(4-carbamoylphenyl)benzamide, 3-amino-4-chlorobenzamide, N-(6-chlorobenzothiazol-2-yl)-4-aminobenzamide, N-(2,4-dihydroxyquinazolin-6-yl)-4aminobenzamide, 4-phenoxyaniline, 2-acetamino-4-amino-5-chlorotoluene, dimethy15-amino-1,3-benzenedicarboxylate, 2-amino-5-chloro-4-methylbenzenesulfonic acid, 4-amino-2,5-dimethoxy-N-methylbenzenesulfonamide, 4-amino-2,5-dimethoxybenzenesulfanilide, 4-amino-2-methoxy-5-methyl-N-methylbenzenesulfonamide and 3-amino-4-methoxy-N,N-diethylbenzenesulfonamide.

Suitable aromatic amines also include naphthylamines and substituted naphthylamines, such as 1-naphthylamine, 2naphthylamine, 4-nitronaphthylamine, 2- or 4-methoxynaphthylamine, 4-chloronaphthylamine, 2- or 4-ethoxynaphthylamine, 2- or 4-methylnaphthaline, 4-(2-ethoxyphenylazo)naphthylamine, and 4-(2-methoxyphenylazo)naphthylamine and also aminofluorenes, such as 2-aminofluorene, further aminoanthraquinones, for example 1-aminoanthraquinone, 2aminoanthraquinone, 1-amino-3-bromoanthraquinone, and 1-amino-3-chloroanthraquinone, 1-amino-2-chloroanthraquinone, 1-amino-4-chloroanthraquinone, 1-amino-5-chloroanthraquinone, 1-amino-6-chloroanthraquinone, 1-amino-5,8-dichloroanthraquinone, 1-amino-2bromoanthraquinone, 1-amino-2,4-dibromoanthraquinone, 1-amino-6,7-dichloroanthraquinone, 1-amino-6-fluoroanthraquinone, 1-amino-7-fluoroanthraquinone, 1-amino-6,7-difluoroanthraquinone, 2-amino-1-chloroanthraquinone, 2-amino-3-chloroanthraquinone, 2-amino-3-bromoanthraquinone, 1-amino-4-nitroanthraquinone,1-amino-5-nitroanthraquinone, 1-amino-2-methylanthraquinone,1-amino-2-methyl-4-chloroanthraquinone, 1-amino-2-methyl-4-bromoanthraquinone, 1-aminoanthraquinone-2-carboxylic acid, 1-aminoanthraquinone-2-carboxamide, methyl 1-aminoanthraquinone-2-carboxylate, 1-amino-4-nitroanthraquinone-2carboxylic acid, 1-amino-2-acetylanthraquinone, 1-amino-4-acetylaminoanthraquinone, 1-amino-5-acetylaminoanthraquinone 1-amino-5-benzoylaminoanthraquinone, 1-amino-4benzoylaminoanthraquinone, 1-amino-8-benzoylaminoanthraquinone, 1-amino-4-hydroxyanthraquinone, 1-amino-5hydroxyanthraquinone, 1-amino-4-methoxyanthraquinone, 1-amino-2-methoxy-4-hydroxyanthraquinone, 1-amino-4-methylaminoanthraquinone, 1-amino-4-benzylaminoanthraquinone, 1-amino-4-cyclohexylaminoanthraquinone, 1-amino-4-anilinoanthraquinone, 1-amino-2-bromo-4-(methylmercapto)-anthraquinone, 1-amino-4-(4-methylphenylsulfonylamino)-2-(phenylthio)anthraquinone and 1-amino-6-(methylmercapto)anthraquinone.

Further suitable aromatic amines are heterocyclic amines such as 2-aminocarbazole, 5-aminobenzimidazol-2-one, 6aminobenzothiazole, 6-amino-2-acetamidobenzothiazole, 7aminoquinoline, 7-amino-2-hydroxyquinoline, 7-amino-2-hydroxy-4-methylquinolineand7-amino-2-hydroxy-4-methyl-6-methoxyquinoline, and also 5-amino-6-methylbenzimidazol-2-one.

Further suitable aromatic amines are heterocyclic amines such as 2-aminocarbazole, 5-aminobenzimidazol-2-one, 6-aminobenzothiazole, 6-amino-2-acetamidobenzothiazole, 7-amino-2-hydroxy-4-methyl-6-methoxyquinoline, and also 5-amino-6-methylbenzimidazol-2-one. Further suitable heterocyclic amines are 2-amino-6-methoxybenzothiazole, 2-amino-6-ethoxybenzothiazole, 2-amino-6-nitrobenzothiazole, 3-amino-6-chloroindazole, 5-aminophthalimide,6-aminoquinazoline-2,4-dione, 6-amino-3-methylq-uinazoline-2,4-dione, 7-aminoquinazoline-2,4-dione, 6-amino-2-methylquinazolin-4-one, 6-amino-2-hydroxy-4-methylquinazolin which may additionally be substituted by 5-methyl, 7-chloro, 7-methyl, 7-ethoxy, 8-methyl, 8-methoxy or 8-carbomethyl, 6-amino-5-chloro-4,8-dimethyl-2-hydroxyquinoline, 6-amino-8-chloro-4,5-dimethyl-2-hydroxyquinoline, 6-amino-5,8-dimethoxy-4-methyl-2-hydroxyquinoline, 6-amino-5-chloro-2-hydroxy-8-methoxy-4-methylquinoline, 6-amino-4,5,8-trimethyl-2hydroxyquinoline, 7-amino-2-hydroxy-4-methylquinoline which may additionally be substituted by 6-nitro, 6-sulfo, 6-isopropoxy, 6-butoxy, 6-methoxy, 6-methyl, 6-chloro, 5-chloro or 5-methyl, 6-amino-5,8-dimethyl-2-hydroxyquinoline, 5-aminoindazole, 6-aminoindazole, 7(8)-amino-4-methylbenzimidazo[1,2-a]pyrimid-2-one, 5-amino-2-acetamidobenzimidazole, 5-amino-2-carbomethoxyaminobenzimidazole, 6-aminophthalazine-1,4-dione, 6-aminoquinoxaline-2,3-dione, 6-aminobenzothiazol-2-one,6(7)-amino-3-phenylbenzo [e][1,3]oxazine-2,4-dione, 6- or 7-aminobenzo [e][1,3]oxazine-2,4-dione, 5-amino-1-methylbenzimidazol-2-one, 6- or 7-aminobenzo[e][1,4]oxazin-3-one, 5-amino-2-(2-hydroxyphenyl)-benzotriazole, 11-aminodibenzo [a,c]phenazine, 4- or 3-amino-1,8-naphthalimide, 5-aminobenzimidazol-2-one which is substituted in position 6 by carboxyl, nitro, carboxyethyl, bromine, carboxybutyl, chlorine, carboxymethyl, methoxy or ethoxy, 5-aminobenzimidazol-2-one which is substituted in position 7 by methoxy, methyl or chlorine, 5-amino-4,6-dichlorobenzimidazol-2-one, 5-amino-4,6,7-trichlorobenzimidazol-2-one, 6-amino-4-chloro-5-nitrobenzimidazol-2-one,7-amino-5-chloro-1-methylbenzimidazol-2-one, 8-amino-6-chloro-1-methylquinoxaline-2,3-dione, 4-amino-6-chlorobenzimidazole, 4-amino-6-chloro-2-methylbenzimidazole, aminobenzo [c,d]indol-2-one, 6-amino-7-nitroquinazoline-2,4dione, 6-amino-7-chloroquinazoline-2,4-dione, 6-amino-8-nitroquinazoline-2,4-dione, 7-amino-6-nitroquinazoline-2,4-dione, 6-aminoquinoxaline-2,3-dione which is substituted in position 7 by carboxyl, methoxy, ethoxy, methyl, chlorine or nitro, 7-amino-5-chloroquinoxaline-2,3-dione, 6-amino-5,7-dichloroquinoxaline-2,3-dione, 6-amino-5,7,8-trichloroquinoxaline-2,3-dione, 6-amino-5-chlorobenzoxazol-2-one, 5-amino-7-chlorobenzoxazol-2-one and 5-amino-6-methylbenzimidazole-2-thione.

The coupling component to be used for the azo coupling according to the invention, namely 1,5-diazabicyclo[3.3.0]octane-2,4,6,8-tetrone is known. The compound can be prepared for example according to Arch. Pharm. (Weinheim) 319, 646 (1986) from pyrazolidine-3,5-dione by reaction with malonile chloride or according to GB-A-1,357,639 (U.S. Pat. No. 3,694,216, issued to Jenkins on Sept. 26, 1972) by reacting ethyl malonate with hydrazine dihydrochloride and sodium butylate.

The compounds of the formula (I) according to the invention are prepared in a conventional manner by coupling the diazotized amines with the coupling component mentioned in an aqueous medium, in the presence or absence of nonionic, anionic or cationic surface-active substances. If desired, it is also possible to include in the manufacturing process for the colorants other assistants, such as natural or synthetic resins or resin derivatives or paint, printing ink or plastics additives. The coupling reaction can also be carried out wholly or partly in organic solvents.

The compounds of the formula (I) according to the invention are useful water-insoluble colorants and can be isolated in a conventional manner after the coupling reaction. Frequently, it is advantageous to subject the azo colorants in particular in the case of pigments, after the coupling reaction to an aftertreatment for obtaining the full tinctorial strength and a particularly favorable crystal structure. For this purpose it is possible for example to heat the moist or dried and ground compounds in organic solvents, for example pyridin, N-methyl-2-pyrrolidone, dimethylformamide, dimethyl sulfoxide, alcohols, chlorobenzene, dichlorobenzene, glacial acetic acid, quinoline, glycol, nitrobenzene or high-boiling aromatic hydrocarbons, at elevated temperatures under reflux or under pressure for some time. In some cases successful conversion into a particularly favorable crystal structure is also obtained simply by heating with water and atmospheric or superatmospheric pressure and in the presence or absence of dispersants or organic solvents, for example of the aforementioned type.

It is also possible to convert the compounds of the formula (I) according to the invention which contain one or more lakable acid groups, such as sulfo and carboxyl groups into color lakes in a conventional manner using the customary metal ions, preferably manganese or strontium, but in particular calcium and barium, ions.

The present invention also provides a method of using the water-insoluble compounds of the formula I prepared according to the invention for coloring natural and synthetic materials. Depending on whether the compounds according to the invention have no or short alkyl chains, for example up to $C_4$, or, alternatively, medium or long alkyl chains, they are suitable for example for use as pigments, disperse dyes or fat dyes. Preference is given to using the compounds according to the invention which have short or no alkyl chains as pigments. They are suitable for example for coloring or pigmenting polystyrene, polyolefins, in particular polyethylene or polypropylene, polyacrylic compounds, polyvinyl compounds, in particular polyvinyl chloride, polyvinyl acetate, polyesters, rubber, casein resins and silicone resins. They are also suitable for preparing printing inks and varnish and emulsion paints and for printing on substrates such as textile fibers or even on other sheetlike structures, for example paper.

The pigments according to the invention can also be used —preferably in a finely divided form—for coloring filaments made of viscose or cellulose ethers, cellulose esters, polyamides, polyurethanes or polyglycol phthalates in the mass or for coloring paper.

In the Examples below, parts are by weight, while parts by volume bear the same relation to parts by weight as the liter to the kilogram.

Examples 1) 34.12 parts of 3-amino-4-chlorobenzamide are stirred overnight in 200 parts of water together with 60 parts by volume of 31% strength hydrochloric acid. This is followed by cooling down to 5° C. and diazotization with 40 parts by volume of 5 N sodium nitrite solution. After one hour of stirring the nitrite excess is destroyed with amidosulfuric acid, and the diazonium salt solution is clarified by filtration.

16.81 parts of 1,5-diazabicyclo[3.3.0]octane-2,4,6,8tetrone are suspended in 760 parts of water and dissolved by adding 40 parts by volume of 4 N sodium acetate solution, and the solution is subsequently clarified.

A coupling vessel is charged with the clarified diazonium salt solution and 20 parts by volume of a 10% strength aqueous solution of the reaction product of 1 mole of oleyl alcohol and 25 moles of ethylene oxide. The solution of the coupling component is slowly added dropwise or continuously to this mixture at 10° to 15° C. After the coupling has ended, the temperature is raised to 80° C. by passing in steam, and the pigment is filtered off with suction after 10 minutes and washed with water. The moist presscake is subsequently admixed with 500 parts by volume of glacial acetic acid and refluxed for 30 minutes. After cooling down, the pigment is filtered off with suction, washed with glacial acetic acid and then with water, dried and ground. The disazo pigment obtained conforms to the abovementioned formula (I) where $D^1$ and $D^2$ are each 5-carbamoyl-2-chlorophenyl. The pigment decomposes at 346° to 350° C. and on incorporation in an alkyd melamine resin varnish gives colorings of excellent hiding power, good light fastness and satisfactory overlacquering fastness.

2) 57.06 parts of 3-amino-4-methoxy-N-(4-carbamoylphenyl)benzamide are stirred for 1 hour together with 800 parts by volume of glacial acetic acid and 60 parts by volume of 31% strength hydrochloric acid, cooled down to 10° C. and diazotized with 40 parts by volume of 5 N sodium nitrite solution. After 45 minutes of stirring, excess nitrite is destroyed with amidosulfuric acid, and the diazonium salt solution is clarified.

The diazonium salt solution is then admixed with 20 parts by volume of a 10% strength aqueous solution of the reaction product of 1 mole of oleyl alcohol and 25 moles of ethylene oxide and also 100 parts by volume of 4 N sodium acetate solution. The mixture obtained is gradually admixed dropwise at 15 to 20° C. with a solution of the coupling component prepared as described in Example 1.

After the coupling has ended, the temperature is raised to 95° C. by passing in steam, and after 10 minutes at that temperature the pigment is filtered off with suction and washed with water. The moist presscake is admixed with 1000 parts by volume of glacial acetic acid by stirring, and the mixture obtained is heated under reflux for 10 minutes. After cooling down, the pigment is filtered off with suction, washed with glacial acetic acid then with acetone, dried and ground. The structure of the pigment obtained conforms to the formula (I) where $D^1$ and $D^2$ are each 5-[4-(carbamoyl)-phenylaminocarbonyl]-2-methoxyphenyl. The pigment has a decomposition point of 318 to 319° C. On incorporation in polyvinyl chloride or in an alkyd-melamine varnish, it gives red colorings of excellent migration and solvent fastness 3) to 38) The procedure of Examples 1) and 2) is followed using diazo components of the formula (Ia) to obtain azo pigments of the formula (I) where $D^1$ and $D^2$ denote the amino-aryl radical of the formula (Ia). The azo pigments are also characterized by the hues and decomposition points (dec.) given in the Table:

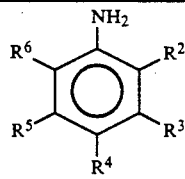

(Ia)

| Ex. | $R^2$ | $R^3$ | $R^4$ | $R^5$ | $R^6$ | Dec. [°C.] | Hue |
|---|---|---|---|---|---|---|---|
| 3 | $OCH_3$ | H | $SO_2NHC_6H_5$ | $OCH_3$ | H | >340 | Bluish red |
| 4 | $NO_2$ | H | Cl | H | H | >340 | Orange |
| 5 | $OCH_3$ | H | H | $CONHC_6H_5$ | H | 320–325 | Yellowish red |
| 6 | $CF_3$ | H | H | H | H | 311–313 | Reddish yellow |

-continued

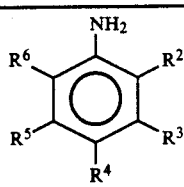

(Ia)

| Ex. | R² | R³ | R⁴ | R⁵ | R⁶ | Dec. [°C.] | Hue |
|---|---|---|---|---|---|---|---|
| 7 | CO₂CH₃ | H | H | H | H | 325–328 | Reddish yellow |
| 8 | CO₂CH₃ | H | H | CONH—(2-Cl,5-Cl-phenyl) | H | 332–335 | Greenish yellow |
| 9 | CH₃ | H | SO₂NHCH₃ | OCH₃ | H | 334–336 | Orange |
| 10 | CH₃ | H | | NO₂ | H | 301–303 | Reddish yellow |
| 11 | Cl | H | NO₂ | H | H | >340 | Orange |
| 12 | NO₂ | H | NO₂ | H | H | >340 | Yellow |
| 13 | H | CO₂CH₃ | H | CO₂CH₃ | H | 293–295 | Yellow |
| 14 | OCH₃ | H | H | SO₂N(C₂H₅)₂ | H | 295–298 | Orange |
| 15 | CH₃ | H | H | CONHCH₃ | H | 295–298 | Orange |
| 16 | Cl | H | H | CF₃ | H | 351–352 | Reddish yellow |
| 17 | Cl | H | Cl | H | H | >340 | Orange |
| 18 | Cl | H | Cl | Cl | H | 346–348 | Reddish yellow |
| 19 | OCH₃ | H | NO₂ | H | H | >350 | Orange |
| 20 | OCH₃ | H | SO₂NHCH₃ | OCH₃ | H | 343 | Bluish red |
| 21 | NO₂ | H | CH₃ | H | H | >340 | Orange |
| 22 | H | H | CONH₂ | H | H | >340 | Reddish yellow |
| 23 | H | H | NO₂ | H | H | >340 | Yellow |
| 24 | CO₂H | H | H | H | H | 298–301 | Orange |
| 25 | CO₂C₄H₉ | H | H | H | H | 285 | Reddish yellow |
| 26 | CH₃ | H | Cl | H | H | 308–310 | Orange |
| 27 | Cl | H | CH₃ | NHCOCH₃ | H | 318 | Bluish red |
| 28 | CO₂CH₃ | H | H | CO₂CH₃ | H | 340 | Yellow |
| 29 | H | H | H | H | H | 294 | Reddish yellow |
| 30 | CH₃ | H | H | H | H | 264 | Orange |
| 31 | H | Cl | H | H | H | 320–324 | Reddish yellow |
| 32 | H | H | Cl | H | H | 320–323 | Reddish yellow |
| 33 | CH₃ | H | CH₃ | H | H | 255 | Orange |
| 34 | Cl | H | H | Cl | H | 338 | Reddish yellow |
| 35 | Cl | H | H | H | H | 305 | Reddish yellow |
| 36 | H | COOH | H | H | H | >350 | Reddish yellow |
| 37 | H | H | CH₃ | H | H | 320 | Orange |
| 38 | COOH | H | H | Cl | H | 318–319 | Reddish yellow |

39) 31.38 parts of 4-chloro-2-nitroaniline and 3.10 parts of 3-amino-4-chlorobenzamide (mutual molar ratio 10:1) are stirred in 300 parts of water and 60 parts by volume of 31% strength hydrochloric acid for 2 hours, the mixture is then cooled down to 5° C, and 40 parts by volume of 5 N sodium nitrite solution are added at 5–10° C. to bring about diazotization. This is followed by one hour of stirring, destruction of the excess nitrite with amidosulfuric acid, and clarification. The diazo component solution thus obtained is reacted analogously to the solution of the diazo component in Example 1, and the crude pigment obtained is treated analogously to Example 1. An orange-colored pigment having a decomposition point of above 350° C. is obtained.

40) Example 39) is repeated, except that a molar ratio of 1:1 between the diazo components is used. An orange-colored pigment having a decomposition point of 310° to 313° C. is obtained.

41) Example 39) is repeated, except that the diazo components used are 4-chloro-2-nitroaniline and 3-amino-4-chlorobenzamide in a molar ratio of 1:10. An orange-colored pigment having a decomposition point of 330° C. is obtained.

42) Example 39) is repeated, except that the diazo components used are 3-amino-4-methoxybenzanilide and 4-amino-2-methoxy-5-methyl-N-methylbenzenesulfonamide in a molar ratio of 10:1. A yellowish red pigment having a decomposition point of 308° C. is obtained.

43) Example 42) is repeated, except that a molar ratio of 1:1 is used. The yellowish red pigment obtained has a decomposition point of 276° to 278° C.

44) Example 42) is repeated, except that a molar ratio of 1:10 is used. An orange-colored pigment having a decomposition point of 306° C. is obtained.

45) Example 39) is repeated, except that the diazo components used are 2-(trifluoromethyl)aniline and methyl anthranilate in a molar ratio of 10:1. The reddish yellow pigment obtained has a decomposition point of 321° C.

46) Example 45) is repeated, except that a molar ratio of 1:1 is used, affording a reddish yellow pigment having a decomposition point of 302° C.

47) Example 45) is repeated, except that a molar ratio of 1:10 is used, affording a reddish yellow pigment having a decomposition point of 301° C.

48) to 61) If Example 1) or Example 2) are repeated using in place of the diazo components used there the aromatic amines listed in the table below in the appropriate molar ratio, based on the amount of coupling component used, further pigments according to the invention are obtained having the hues and decomposition points (dec.) given in the table:

| Ex. | D—NH$_2$ (diazo component) | Dec. [°] | Hue |
|---|---|---|---|
| 48 | 1-Aminoanthraquinone | >350 | Medium yellow |
| 49 | 2-Aminoanthraquinone | >350 | Reddish yellow |
| 50 | 4-Phenylazoaniline | >350 | Red |
| 51 | 2-Aminofluorene | 340 | Brick red |
| 52 | 1-Amino-4-nitronaphthalene | 325 | Maroon |
| 53 | 4-(2-methylphenylazo)-2-methylaniline | >350 | Brown |
| 54 | 4-Phenoxyaniline | 305 | Scarlet |
| 55 | 2-Aminocarbazole | 308 | Brown |
| 56 | 6-Amino-2-acetamido-benzothiazole | 350 | Maroon |
| 57 | 4-Amino-N-(6-chlorobenzo-thiazol-2-yl)benzamide | >350 | Orange |
| 58 | 7-Amino-2-hydroxy-4-methyl-quinoline | 345 | Brown |
| 59 | 7-Amino-2-hydroxy-6-methoxy-4-methylquinoline | 340 | Brown |
| 60 | 4-Amino-N-(2,4-dihydroxy-quinazolin-6-yl)benzamide | >350 | Orange |
| 61 | 5-Amino-6-methylbenz-imidazol-2-one | 340 | Violet |

62) 22.2 parts of 2-amino-5-chloro-4-methylbenzenesulfonic acid are stirred overnight in 300 parts by volume of water and 30 parts by volume of 31% strength hydrochloric acid. This is followed by diazotization at 0–5° C. with 20 parts by volume of 5 N sodium nitrite solution, stirring for 1 hour with sodium nitrite excess, and destruction of excess nitrite with amidosulfuric acid. The diazonium salt solution clarified by filtration is then admixed with 10 parts by volume of a 10% strength aqueous solution of the reaction product of 1 mole of oleyl alcohol and 25 moles of ethylene oxide, and the pH of the solution is adjusted to 4.6 with 4 N sodium acetate solution.

A solution prepared as described in Example 1 from 8.4 parts of coupling component is slowly added dropwise at 15–20° C. to the mixture obtained. After the coupling has ended, the pH of the mixture is adjusted with 31% strength 1, and the solid is filtered off with suction. The presscake is suspended in 5000 parts of water, and a solution of 35 parts of calcium chloride in 350 parts of water is then slowly added dropwise, and the reaction mixture is stirred for one hour and then heated at 80° C. for 30 minutes. The mixture is filtered with suction while still hot, washed with water and dried. On grinding, this gives 27.4 parts of a bluish red pigment having a melting point of >350° C.

We claim:
1. A compound of the formula (I)

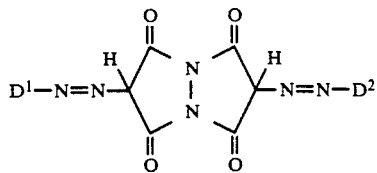

or a mixture thereof, wherein $D^1$ and $D^2$ are each independently of the other an aryl or heteroaryl radical from the group consisting of:

phenyl, phenyl having 1-3 substituents, naphthyl, naphthyl having 1-4 substituents, an anthraquinone or fluorene each thereof being unsubstituted or having up to 4 substituents, and a single five- or six-membered nitrogen-containing heterocyclic nucleus which contains 1-3 identical or different nuclear hereto atoms from the group consisting of nitrogen, oxygen and sulfur, or at least 1 five- or six-membered nitrogen-containing heterocyclic nucleus being fused with at least 1 benzene nucleus thus forming a polycyclic structure with up to 5 condensed aromatic rings, the heterocyclic nuclei thereof each containing 1-3, together at most up to 4, identical or different nuclear heteroatoms from the group consisting of nitrogen, oxygen and sulfur, each of the foregoing single heterocyclic or benzo-condensed ring structures thereof being unsubstituted or having up to 4 identical or different substituents such substituents on the aforesaid aryl or heteroaryl radicals $D^1$ and $D^2$ independently of the other having the following meaning of $A^1$ and $A^2$ where $A^1$ stands for a radical from the group consisting of saturated or unsaturated straight-chain or branched $C_1$–$C_{24}$-alkyl, $C_1$–$C_{24}$-alkoxy, $C_1$–$C_{24}$-hydroxyalkyl, $C_5$–$C_{10}$-cycloalkyl, $[C_1$–$C_{24}]C_2$–$C_{25}$-alkoxycarbonyl, $C_2$–$C_{25}$-alkanoyloxy, $C_2$–$C_{25}$-alkanoylamino, $C_1$–$C_{24}$-alkylsulfonyl, carbamoyl, N-($C_1$–$C_{12}$-alkyl)aminacarbonyl, N,N-di-($C_1$–$C_{12}$-alkyl) amino-carbonyl, $C_1$–$C_{12}$-alkylamino, N,N-di-($C_1$–$C_{12}$-alkyl) amino, sulfamoyl, N-($C_1$–$C_{12}$-alkyl)aminosulfonyl, N,N-di-($C_1$–$C_{12}$-alkyl) aminosulfonyl, halogen, nitro, cyano, trifluoromethyl, carboxyl, sulfo, $C_1$–$C_{12}$-alkylthio, $C_2$–$C_{25}$-alkanoyl and hydroxyl and $A^2$ stands for a radical of the formula Ar—W—where W is a direct bond or a divalent group of the formula —S—, —O—, —CO—, —CO—O—, —O—CO—, —CO—NH—, —NH—CO—, —SO—, —SO$_2$—, —SO$_2$NH—, —NHSO$_2$—, —CH$_2$—, —CH(CH$_3$)—, —C(CH$_3$)$_2$—, —NR'— (where R' denotes hydrogen or $C_1$–$C_6$—alkyl) or is —N=N— or a combination of at least two of the foregoing divalent groups and Ar denotes phenyl, naphthyl, or a phenyl with one being fused with a five- or six-membered nitrogen-containing heterocyclic nucleus thus forming a bicyclic structure of 2 condensed aromatic rings, the heterocyclic nucleus thereof containing 1-3 identical or different nuclear heteroatoms from the group consisting of nitrogen, oxygen or sulfur, or one of the aforesaid radicals Ar having 1-3 identical or different substituents as above defined for $A^1$.

2. A compound as claimed in claim 1, wherein $D^1$ and $D^2$ are each independently of the other an aryl or heteroaryl radical from the group consisting of:

phenyl, phenyl having 1-3 substituents, naphthyl, naphthyl having 1-3 substituents, an anthraquinone or fluorene each thereof being unsubstituted or having 1 to 3 substituents, and a single five-membered nitrogen-containing heterocyclic nucleus which contains 2 or 3 identical or different nuclear heteroatoms from the group consisting of 1 nitrogen combined with 1 sulfur, and 2 nitrogens combined with 1 sulfur, or 1 or 2 five-or six-membered nitrogen containing heterocyclic nuclei being fused with 1 or 2 benzene nuclei thus forming a polycyclic structure with 2 or 3 condensed aromatic rings, the heterocyclic nuclei thereof together containing at most 4, individually at most 3, identical or different nuclear heteroatoms from the group consisting of up to 3 nitrogens, 1 nitrogen combined with 1 oxygen, and 1 nitrogen combined with 1 sulfur, or a combination of 1 five-membered and 1 six-membered nitrogen-containing heterocyclic nucleus being fused with one another thus forming a bicyclic structure of the 2 condensed aromatic rings, the both nuclei together containing at most 4, individually at most 3 nuclear nitrogen atoms, each of the foregoing single heterocyclic or benzo-condensed ring structures thereof being unsubstituted or having 1-3 identical or different substituents, such substituents on the aforesaid aryl or heteroaryl radicals $D^1$ and $D^2$, independently of the other, each having the following meaning of $A^1$ or $A^2$ where $A^1$ stands for a radical from the group consisting of $C_1$-$C_5$-alkyl, $C_1$-$C_4$-alkoxy, $C_1$-$C_4$-alkoxycarbonyl, $C_2$-$C_5$-alkanoyloxy, $C_2$-$C_5$-alkanoylamino, carbamoyl, N-($C_1$-$C_4$-alkyl)aminocarbonyl, N,N-di-($C_1$-$C_4$-alkyl)aminocarbonyl, sulfamoyl, N-($C_1$-$C_4$-alkyl)-and N,N-di-($C_1$-$C_4$-alkyl)amino-sulfonyl, chlorine, bromine, nitro, trifluoromethyl, ethylsulfonyl, carboxyl, sulfo and cyano and $A^2$ stands for a radical of the formula Ar—W— where W is a divalent group of the formula —O—, —CO—O—, —O—CO—, —CO—NH—, —NH—CO—, —SO$_2$—, —SO$_2$—NH—, —NHSO$_2$—, —CH$_2$—, —NH—OR —N═N— or is a combination of two of the divalent groups mentioned and Ar denotes phenyl, naphthyl, or a phenyl being fused with 1 five-or six-membered nitrogen-containing heterocyclic nucleus thus forming a bicyclic structure of 2 condensed aromatic rings, the heterocyclic nucleus thereof containing 1 or 2 identical or different nuclear heteroatoms of the group consisting of up to 2 nitrogen, and 1 nitrogen combined with 1 sulfur, or one of the aforesaid radicals Ar having 1-3 identical or different substituents as above-defined for $A^1$.

3. A compound as claimed in claim 1, wherein $D^1$ and $D^2$ are each independently of the other an aryl or heteroaryl radical from the group consisting of:

phenyl, naphthyl, anthraquinone, fluorene, benzimidazole, benzimidazol-2-one, phthalimide, quinazoline, quinazolin-4-one, carbazole, benzothiazole, quinazoline-2,4dione, indole, isoindole, quinoline, indazole, quinolin-2-one, benzimidazo[1,2-a]pyrimid-2-one, benzothiazol-2-one, benzo[e][1,3]oxazine-2,4-dione, benzo[e][1,4]oxazin-3-one, benzotriazole, benzoxazol-2-one, benzimidazole-2-thione, benzo]cd]indol-2-one, benzo [de]isoquinoline-1,3-dione (naphthalimide), 1,2,4-thiadiazole, 1,3,4-thiadiazole, thiazole, isothiazole, thiophene, dibenzo[a,c]-phenazine, isoquinoline, quinoxaline, quinoxaline-2,3-dione, cinnoline and phthalazine, each of the aforesaid aryl or heteroaryl radicals $D^1$ and $D^2$ independently of the other being unsubstituted or having 1-3 identical or different substituents corresponding to the meaning as defined for $A^1$ or $A^2$ in claim 2.

* * * * *

UNITED STATES PATENT AND TRADEMARK OFFICE
CERTIFICATE OF CORRECTION

PATENT NO.   :   5,026,831
DATED        :   June 25, 1991
INVENTOR(S)  :   Jung ET AL.

It is certified that error appears in the above-identified patent and that said Letters Patent is hereby corrected as shown below:

In column 12, line 19, please replace "hereto" with --hetero--.

In column 12, line 32, please insert a comma between "substituents, such".

In column 12, line 42, please replace "aminacarbonyl" with --aminocarbonyl--.

In column 12, line 39, "$[C_1-C_{24}]C_2-C_{25}$" should read --$C_2-C_{25}$--.

In column 12, line 59, please delete the phrase "with one".

In column 14, line 5, the term "OR" should read --or--.

In column 14, line 25, please insert the dash between "2,4-dione".

In column 14, line 30, please replace "benzo]cd]indol-2-one" with --benzo[cd]indol-2-one--.

Signed and Sealed this

Sixteenth Day of March, 1993

*Attest:*

STEPHEN G. KUNIN

*Attesting Officer*        *Acting Commissioner of Patents and Trademarks*